United States Patent [19]

Take et al.

[11] Patent Number: 4,544,424

[45] Date of Patent: Oct. 1, 1985

[54] GYPSUM BOARD MANUFACTURING METHOD

[75] Inventors: Takao Take, Chiba; Katuaki Kaneko; Sigeo Otozaki, both of Tokyo, all of Japan

[73] Assignee: Onoda Cement Co., Ltd., Yamaguchi, Japan

[21] Appl. No.: 437,327

[22] Filed: Oct. 28, 1982

[30] Foreign Application Priority Data

Nov. 2, 1981 [JP] Japan .............................. 56-174452

[51] Int. Cl.[4] .............................................. B32B 13/08

[52] U.S. Cl. ....................................... 156/39; 156/42; 156/44; 156/284; 156/308.8; 427/27; 427/32; 428/703

[58] Field of Search .................. 428/537, 703; 156/44; 156/42, 283, 284, 308.6, 308.8; 427/27, 32

[56] References Cited

U.S. PATENT DOCUMENTS

| | | | |
|---|---|---|---|
| 1,511,500 | 10/1924 | Brookby | 428/537 |
| 3,692,606 | 9/1972 | Miller et al. | 156/283 |
| 3,919,042 | 11/1975 | Spiller | 427/32 |

FOREIGN PATENT DOCUMENTS

| | | | |
|---|---|---|---|
| 879392 | 10/1961 | United Kingdom | 156/44 |

*Primary Examiner*—George F. Lesmes
*Assistant Examiner*—P. R. Schwartz

[57] ABSTRACT

Described is a novel gypsum board and a manufacturing method therefor by first forming a particulate layer securely adhered to the base paper for the gypsum board and by utilizing an adhesion layer which has been formed by the reaction of the particulate layer for pasting the gypsum core material on the base paper for board, so that adhesion between the core material and the base paper is enhanced as well as the strength of the gypsum board itself is improved.

1 Claim, 4 Drawing Figures

GYPSUM BOARD MANUFACTURING METHOD

BACKGROUND OF THE INVENTION

The present invention relates to gypsum boards and a method for manufacturing the same.

A gypsum board is an inflammable construction material made of a core material of gypsum which is covered with base paper to form a board. It is widely used as an interior finish material for walls and ceilings of buildings. However, troubles often occur during handling as the base paper easily peels off the gypsum core material. In conventional manufacturing processes a slurry containing calcined gypsum as the main component is directly poured between two sheets of base paper, molded and hardened to cause the core material to adhere to the base paper. The adhesion thus obtained, however, has not been satisfactory. Light-weight gypsum board which is manufactured by mixing a large amount of air bubbles in the slurry is particularly defective as the base paper is very likely to peel off from the gypsum core material because of smaller contact area between the slurry and paper. Various methods have been proposed to improve the adhesion such as by impregnating the base paper with soluble phosphate (Jap. Pat. Pub. No. Sho-53-28173), by coating the surface of the base paper previously with an aqueous solution containing water soluble substance or a water emulsion of calcined gypsum mixed (Jap. Pat. Pub. No. Sho-42-27679), etc., but these methods do not necessarily provide satisfactory adhesion. For example, an aqueous solution of a water soluble substance is absorbed by the base paper causing only negative effect. The water emulsion of calcined gypsum is also defective as it tends to migrate into the slurry mainly containing the calcined gypsum to be used as the core material thereby offsetting the intended effect.

SUMMARY OF THE INVENTION

The present invention has been contrived to overcome such defects and provides gypsum boards and a manufacturing method thereof without using these liquid or slurry substance with an aim to improve the adhesion strength of the gypsum core material with the base paper as well as the strength of the gypsum board itself by forming a fixed particulate layer with the base paper in advance. More particularly, the present invention relates to gypsum boards which are characterized in that an adhesion layer is formed between the gypsum core material made of calcined gypsum slurry or slurry containing calcined gypsum as the main component and the base paper, the said adhesion layer being formed by the reaction of the particulate layer which is previously formed fixedly on the base paper. It further relates to a method for manufacturing said gypsum board which is characterized by the steps of first forming a particulate layer fixedly on the base paper and then pouring calcined gypsum slurry or slurry containing gypsum as the main component between two sheets of base paper to cause reaction between said slurry and the particulate layer.

DETAILED DESCRIPTION OF A PREFERRED EMBODIMENT

The gypsum board according to the present invention and the manufacturing method therefor will now be described in more detail with reference to the embodiment shown in the accompanying drawings.

Figure 1:
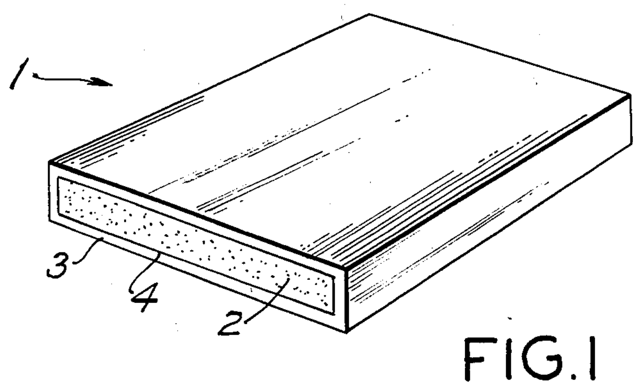
FIG. 1 is a perspective schematic view of a gypsum board according to the present invention.

FIG. 1 shows a perspective schematic view of the gypsum board according to the present invention. In the figure, a gypsum board 1 comprises a gypsum core material 2 and a sheet of base paper 3 which covers the gypsum core material 2. A particulate layer is fixedly formed in advance on the surface of the base paper 3 which comes between the gypsum core material 2 and the base paper 3. Adhesion of the core material 2 with the base paper 3 is achieved by an adhesion layer 4 which is formed by the reaction of the particulate layer.

Figure 2:
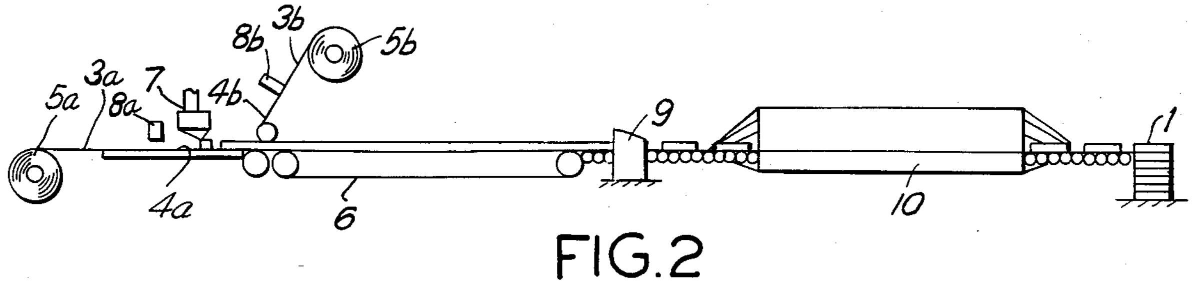
FIG. 2 is a schematic view to illustrate an embodiment of the manufacturing method of gypsum board according to the present invention.

FIG. 2 is a schematic view illustrating an embodiment of the method for manufacturing the gypsum board of the present invention. Two rolls of base paper 3*a* and 3*b* are fed by drums 5*a* and 5*b* onto a belt conveyer 6. Particulate layer 4*a* and 4*b* are fixedly formed on the base paper 3*a*, 3*b* by means of devices 8*a* and 8*b* (to be described later) before the base paper comes in contact with a slurry of calcined gypsum or mixed slurry of calcined gypsum added with light-weight aggregate, pasting agent, etc. (hereinafter referred to as slurry) which is supplied from a hopper 7. In other words, the slurry is poured on the top side surface of the base paper 3*a* which has been fixedly formed with the particulate layer 4*a*. The bottom side surface of the base paper 3*b* which is also formed with the particulate layer 4*b* subsequently covers the said surface supplied with the slurry. It is then adjusted to a desired thickness before subjected to cutting at 9 and drying at 10 as known in the art to obtain the gypsum board 1 of the present invention. The particulate layers 4*a* and 4*b* thus formed react with water contained in the slurry to form an adhesion layer 4 between the base paper sheets 3*a* and 3*b* and the core material 2 formed by the hardened slurry as shown in FIG. 1.

Any type of particles may be used for forming particulate layers 4*a* and 4*b* on the base paper 3*a*, 3*b* so long as they do not affect the hardening of the slurry but react with water in the slurry to become adhesive. For example, powdered calcined gypsum, starch, soluble starch, a product of decomposition of a starch by heat, enzyme or acid (dextrine as the main component), polyvinyl alcohol, vinyl acetate and the like can be used alone or in a mixture of two or more. Using the particulate layer forming devices 8*a* and 8*b* to be described hereunder, the particulate layer is fixedly formed on the base paper 3*a* and 3*b* in a range between 1–50 $g/m^2$ and more preferably 1–20 $g/m^2$. It is not necessary for the layer to be completely and uniformly filled with particle members.

Any type of device which is capable of fixedly forming the particulate layers 4*a* and 4*b* on the base paper 3*a* and 3*b* rather than merely spraying, sprinkling or arranging the same may be used as the particulate layer forming devices 8*a* and 8*b*. For example, it is possible to mechanically or manually rub particles firmly on the base paper 3*a* and 3*b*, or to employ a device for electrically applying particles to the base paper.

Figure 3:
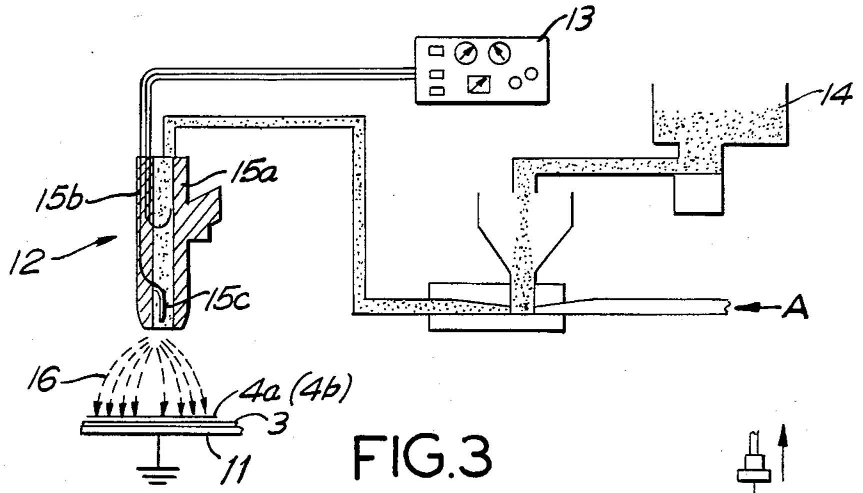
FIG. 3 is a schematic view of an electrostatic coating apparatus as an example of device for forming the particulate layer.

FIG. 3 shows an electrostatic coating apparatus as an example of particulate layer forming devices 8*a* and 8*b*. A spray gun 12 is positioned opposing the base paper 3 (base paper 3*a* or 3*b* in FIG. 2) which is grounded to a ground plate 11. As a high voltage is applied from a power source 13 to electrodes 15*a* and 15*b* contained in the spray gun 12, particles which are mixed with air (Arrow A) and introduced into the spray gun 12 from a particle supplying device 14 are electrically charged to become charged particles. The charged particles are attracted and moved toward the base paper 3 by the effect of air current and electric current 16 generated between an electrode 15*c* for Corona discharge at the tip of the spray gun 12 and the grounded base paper to be adhered to the base paper 3 by Coulomb's law.

The particulate layer 4*a*(4*b*) once formed on the base paper 3 by the charged particles retains the electric charge for a certain period of time and withstands the effects of gravity, air movement or vibration to be able to stably adhere to the base paper 3 and to react with water contained in the slurry poured on the base paper 3. It can therefore form a solid adhesion layer 4 as shown in FIG. 1.

It is noted that the time for initially contacting the base paper 3 having the charged particulate layer with the slurry should be as brief as possible, normally just a few minutes and preferably within 1 minute after deposition of the charged particles on the base paper. If too much time elapses and the electric charge of the particulate layer formed on the base paper is reduced or totally lost, the effect would be substantially the same as when particles are merely sprayed on the base paper. The particles then would easily be mixed with the slurry instead of firmly adhereing to the surface. It is also possible, depending on the desired type of gypsum board, to obtain a gypsum board with only one side being covered which can be achieved by omitting either one of the particulate layer forming devices 8*a* or 8*b* shown in FIG. 2 and by forming said charged particulate layer on only one of the base paper sheets 3*a* or 3*b*.

As has been described in the foregoing with the embodiment shown in the drawings, the present invention for manufacturing gypsum board is capable of forming the particulate layers fixedly on the base paper using an apparatus utilizing simple devices and an extremely small amount of particles. The present invention enhances the adhesion of the base paper with the gypsum core material and even overcomes the problem of defective adhesion of light-weight gypsum board where the adhesive area of the base paper with the gypsum core material is small. Because of enhanced adhesion, use of additives such as starch (dextrine) etc. can be decreased and the cost can be greatly reduced while improving the strength of the product gypsum board itself.

EXAMPLE 1

One side of a base paper (Cream base paper) of 250 g/m$^2$ in weight was electrostatically sprayed with particles as shown in Table 1 to form charged particulate layer. A slurry mixture of 100 parts calcined gypsum, 0.6 parts corn starch, 100 parts water and bermiculite in such an amount that the volume of the gypsum board after drying becomes 6.88 kg/m$^2$ was poured between said coated base paper and uncoated base paper and molded. After left standing for 1 hour, the gypsum board was dried in a dryer at 120° C. until the adherent water content was reduced to less than 1% and again left standing for 24 hours in an atmosphere of the temperature at 20° C. and the humidity at 60% before tested for adhesion. The adhesion test was conducted in accordance with 6.4 separation test of JIS 6901-1975 (gypsum board) using a test sample of 50 mm in width and 120 mm in length. The separated area was divided by the width of the test sample to give a mean separation length. The result is shown in Table 2.

TABLE 1

| | Type of Particle | | Mean Particle Diameter |
|---|---|---|---|
| A | Calcined Gypsum | Gypsum calcined in a kettle for gypsum board | 25 μm |
| B | Oxidized Starch | Nippon Corn Starch KK SK No. 100 | 40 μm |
| C | Polyvinyl Alcohol | Denki Kagaku Kogyo KK K-17S | 200 μm |
| D | Polyvinyl Alcohol | Denki Kagaku Kogyo KK B-17S | 200 μm |

TABLE 2

| | Amount of Coating g/m$^2$ (% for calcined gypsum) | Mean Separation Length mm | |
|---|---|---|---|
| | | Coated | Uncoated |
| A | 10.6 (0.15) | 5 | 15 |
| B | 5.0 (0.07) | 0 | 20 |
| C | 10.4 (0.15) | 5 | 33 |
| D | 16.0 (0.23) | 4 | 40 |

As a comparison, a 40% dispersion solution of oxidized starch in the column B of Table 1 was prepared and sprayed on the base paper in an amount of 10 g/m$^2$ (solid content 4 g/m$^2$, 0.06% for calcined gypsum) to obtain a test sample in the same manner as in Example 1. There was no significant difference in the mean separation length between the sprayed sample (35 mm) and the sample without spraying (40 mm).

EXAMPLE 2

Oxidized starch of Example 1 was rubbed on the base paper to obtain firm coating. Particles which did not adhere to the base paper were brushed off before preparing a test sample in the same manner as in Example 1 for adhesion test. The mean separation length of the test sample having particles rubbed on in an amount of 5 g/m$^2$ (0.07% for calcined gypsum) was 20 mm whereas the one without particles rubbed on was 35 mm.

EXAMPLE 3

In an actual manufacturing process line of gypsum boards (flat board of 9 mm in thickness), the top side surface of base paper (cream, 250 g/m$^2$ in weight) as shown in FIG. 2 where the adhesion layer was to be formed was coated with calcined gypsum or oxidized starch as given in Example 1, using an electrostatic coating apparatus to prepare gypsum boards a and b. Another gypsum board c was prepared which was not coated with said particles.

The samples of 910 mm in width and 1000 mm in length were soaked in water for 30 seconds and subjected to adhesion test after 30 minutes. The test was conducted as follows:

(1) Make an incision with a knife at the length of 500 mm and fold the sample in half.

Figure 4:
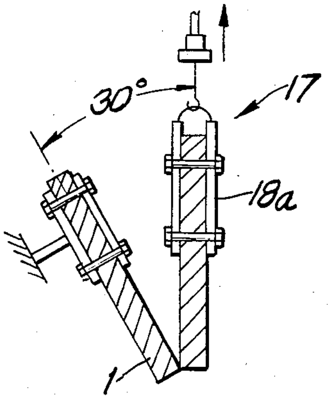
FIG. 4 is a schematic view for testing the adhesion.

(2) Attach the sample to the test machine 17 shown in FIG. 4.

(3) Pull the attachment 18*a* on the right upward at a tensile rate of 10 kg/sec until the paper is peeled.

(4) Measure the area where the paper and the core material are separated.

(5) Divide the area by the width of the board to give mean separation length as the degree of adhesion.

The results are shown in Table 3.

TABLE 3

| | Composition | | | | | Amount of Coating | | |
|---|---|---|---|---|---|---|---|---|
| | Calcined Gypsum | Water | Dextrine | Dehydrating Agent | Foaming Agent | $g/m^2$ | % for Calcined Gypsum | Mean Separation Length (mm) |
| Gypsum Board a | 100 | 72 | 0.7 | 0.2 | 0.1 | 2 | 0.04 | 10 |
| Gypsum Board b | 100 | 72 | 0.7 | 0.2 | 0.1 | 2 | 0.04 | 0 |
| Gypsum Board c | 100 | 72 | 0.7 | 0.2 | 0.1 | 0 | 0 | 50 |

(ratio by weight)

What is claimed is:

1. A process for manufacturing gypsum board having two opposed base paper sheets and a gypsum core layer therebetween, comprising electrostatically depositing a particulate material, reactive with water, on the interior surface of at least one of said paper sheets, in amount sufficient to form thereon a fixed layer of charged particles within the range of from about 1-50 $g/m^2$, and before the charge on said particles has become dissipated, introducing a core-forming slurry containing calcined gypsum between said base paper sheets to form an adhesion layer by contact between said slurry and said charged particulate material, followed by drying and curing to produce a gypsum board of improved strength and having the paper sheets thereof securely adhered to the gypsum core, said particulate material being selected from the group consisting of starch, heat-decomposed starch, dextrine, and mixtures thereof.

* * * * *